(12) United States Patent
Zhou et al.

(10) Patent No.: US 11,606,049 B2
(45) Date of Patent: Mar. 14, 2023

(54) CONTROL CHIP, CONTROL SYSTEM, AND CONTROL METHOD FOR MOTORS

(71) Applicant: AUTOCHIPS WUHAN CO., LTD., Wuhan (CN)

(72) Inventors: Jian Zhou, Hefei (CN); Shujie Lu, Hefei (CN)

(73) Assignee: AUTOCHIPS WUHAN CO., LTD., Wuhan (CN)

( * ) Notice: Subject to any disclaimer, the term of this patent is extended or adjusted under 35 U.S.C. 154(b) by 861 days.

(21) Appl. No.: 15/799,876

(22) Filed: Oct. 31, 2017

(65) Prior Publication Data
US 2018/0123489 A1   May 3, 2018

(30) Foreign Application Priority Data

Oct. 31, 2016   (CN) .......................... 201610942273.7

(51) Int. Cl.
| | | |
|---|---|---|
| H02P 6/00 | (2016.01) | |
| H02P 6/182 | (2016.01) | |
| H02P 6/15 | (2016.01) | |
| H02P 6/28 | (2016.01) | |
| H02P 25/03 | (2016.01) | |

(52) U.S. Cl.
CPC .............. H02P 6/182 (2013.01); H02P 6/157 (2016.02); H02P 6/28 (2016.02); H02P 25/03 (2016.02)

(58) Field of Classification Search
CPC .. H02P 6/182; H02P 6/157; H02P 6/28; H02P 25/03
USPC ...................................................... 318/400.35
See application file for complete search history.

(56) References Cited

U.S. PATENT DOCUMENTS

| | | | |
|---|---|---|---|
| 6,204,621 B1* | 3/2001 | Gotou | H02P 6/10 |
| | | | 318/599 |
| 6,946,808 B2 | 9/2005 | Kandori | |
| 8,018,189 B2 | 9/2011 | Narumi et al. | |
| 2006/0152181 A1 | 7/2006 | Shao et al. | |
| 2007/0126383 A1 | 6/2007 | Takata et al. | |
| 2008/0116837 A1* | 5/2008 | Kelnhofer | H02P 6/182 |
| | | | 318/678 |
| 2009/0153086 A1* | 6/2009 | Narumi | H02P 6/18 |
| | | | 318/400.35 |

(Continued)

FOREIGN PATENT DOCUMENTS

| | | |
|---|---|---|
| CN | 2478280 Y | 2/2002 |
| CN | 1980044 A | 6/2007 |

(Continued)

*Primary Examiner* — Kawing Chan
*Assistant Examiner* — Gabriel Agared (57) ABSTRACT

A control chip, a control system, and a control method for a motor are disclosed. The control chip comprises: an analog comparator comprising a first input terminal and a second input terminal, wherein the first input terminal receives a reference voltage of the motor, the second input terminal receives at least one back EMF (Electromotive Force) of the motor in turn, the analog comparator compares each of the at least one back EMF with the reference voltage in turn through a polling method, so as to produce at least one comparison result and control the motor according to the at least one comparison result. Thereby, the analog comparator is able to compare back EMF with the reference voltage without three comparators, and the cost is therefore saved.

8 Claims, 4 Drawing Sheets

(56) References Cited

U.S. PATENT DOCUMENTS

| | | | |
|---|---|---|---|
| 2012/0268052 A1* | 10/2012 | Nam | H02P 6/10 318/494 |
| 2013/0234634 A1* | 9/2013 | Hofer | H02P 6/14 318/400.09 |
| 2014/0340009 A1 | 11/2014 | Reynolds et al. | |
| 2016/0094168 A1* | 3/2016 | Maekawa | B25F 5/00 318/400.06 |
| 2016/0254766 A1 | 9/2016 | Brown | |

FOREIGN PATENT DOCUMENTS

| | | |
|---|---|---|
| CN | 102638207 A | 8/2012 |
| CN | 103051262 A | 4/2013 |
| CN | 205647313 U | 10/2016 |
| TW | 588505 | 5/2004 |

\* cited by examiner

CONTROL CHIP, CONTROL SYSTEM, AND CONTROL METHOD FOR MOTORS

CROSS-REFERENCE TO RELATED APPLICATIONS

This application claims all benefits accruing under 35 U.S.C. § 119 from China Patent Application No. 201610942273.7, field on Oct. 31, 2016 in the China Intellectual Property Office, the contents of which are hereby incorporated by reference.

TECHNICAL FIELD

Embodiments of the present disclosure generally relate to motor technologies, and in particular relate to a control chip, a control system, and a control method for motors.

BACKGROUND

Brushless motors overcome the defects of brush motors such as structural complexity, noises, maintenance difficulties, and is widely used with the advantages of simple structure, high reliability, energy efficiency, and easily-control. In the zero-crossing detection for back EMF (electromotive force), the key position signal of the permanent magnet rotor may be obtained through detecting a zero-crossing point in which a back EMF is cut-off, when a DC brushless motor stably operates, so as to control the switching of winding current to implement the operation of motors.

In the existed zero-crossing detection for back EMFs of a motor, three external comparators are used to individually examine the zero-crossing points of three back EMFs of the motor. Hence, the problem of high cost is caused since three external comparators are necessary.

SUMMARY

Embodiments of the present disclosure provide a control chip, a control system, and a control method for a motor, which are capable of effectively detecting the zero-crossing point of the back EMF of the motor.

In one embodiment of the present disclosure, a control chip for a motor which is coupled to the motor is provided. The control chip includes an analog comparator including a first input terminal and a second input terminal, wherein the first input terminal receives a reference voltage of the motor, the second input terminal receives one of at least one back EMF of the motor in turn, the analog comparator compares each of the at least one back EMF with the reference voltage in turn through a polling method, so as to produce at least one comparison result and control the motor according to the at least one comparison result.

In another embodiment of the present disclosure, a control system for motors is provided. The control system includes a control chip, a driver circuit, and a motor. The control chip is coupled to the motor through the driver circuit. The driver circuit drives the motor. The control chip is the above control chip.

In another embodiment of the present disclosure, a control method for a motor is provided. The control method includes: obtaining a reference voltage of a motor from the motor; obtaining at least one back EMF of the motor from the motor in turn through a polling method; comparing the at least one back EMF with the reference voltage in turn; and controlling the motor to work according to at least one comparison result.

Advantages of the present disclosure may follow. In comparison with the current implementations, the built-in analog comparator of the present disclosure is able to compare back EMFs with a reference voltage in turn through polling method, the zero-crossing points of the back EMFs could be detected without add on three comparators, and the cost is therefore saved.

DETAILED DESCRIPTION

For a thorough understanding of the present disclosure, numerous specific details are set forth in the following description for purposes of illustration but not of limitation, such as particularities of system structures, interfaces, techniques, et cetera. However, it should be appreciated by those of skill in the art that, in absence of these specific details, the present disclosure may also be carried out through other implementations. In other instances, a detailed description of well-known devices, circuits, and methods is omitted, so as to avoid unnecessary details from hindering the description of the disclosure.

Figure 1:
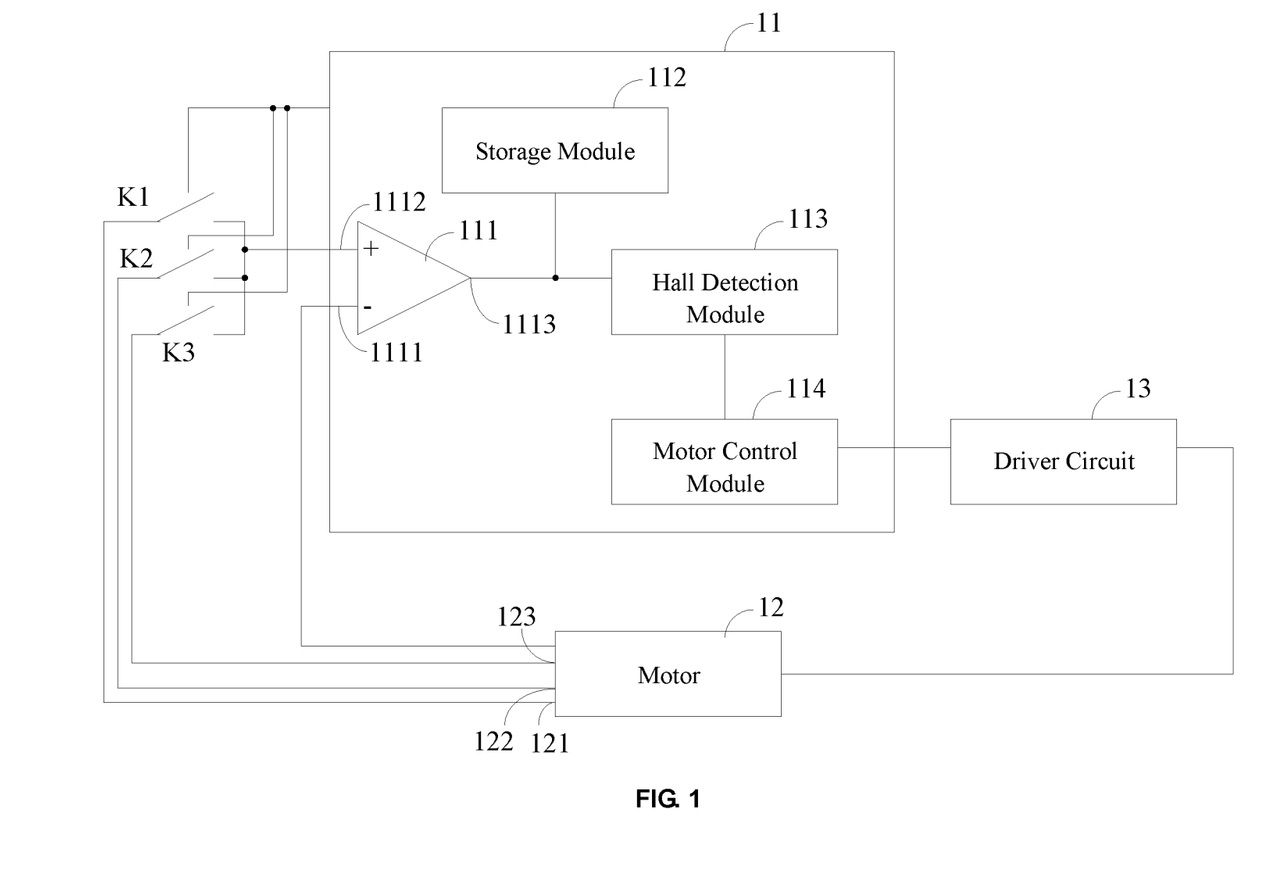
FIG. 1 is a schematic diagram of a control chip for a motor of an embodiment according to the disclosure.

Referring to FIG. 1, a schematic diagram of a control chip for a motor of an embodiment according to the disclosure is depicted. The control chip 11 in the embodiment is used to detect the zero-crossing points of the back EMFs of a motor 12. The motor 12 could be a DC (direct current) brushless motor.

Referring to FIG. 1, the control chip 11 may include an analog comparator 111. That is, the analog comparator 111 is built in the control chip 11. The analog comparator 111 has a first input terminal 1111, a second input terminal 1112 and an output terminal 1113. The first input terminal 1111 and the second input terminal 1112 of the analog comparator 111 are respectively coupled to the motor 12. The first input terminal 1111 receives a reference voltage of the motor 12. For instance, while the reference voltage is the bus voltage of the motor 12, the value could be Vdd/2, (Va+Vb+Vc)/3, or other suitable values. The second input terminal 1112 receives one of one or more back EMFs of the motor 12 in turn. The analog comparator 111 compares each of the one or more back EMFs with the reference voltage in turn through a polling method, so as to produce at least one comparison result, and then the control chip 11 control the motor 12 to operate according to the at least one comparison result. When any one of the one or more back EMFs is equal to the reference voltage, the event of crossing the zero-crossing point is determined to happen.

Wherein, the one or more back EMFs may include a first back EMF, a second back EMF, and a third back EMF. The analog comparator 111 is switched to receive the first back EMF, the second back EMF, and the third back EMF in turn at a predetermined interval, so as to compare the received back EMF with the reference voltage in turn. That is to say, the second input terminal 1112 receives one of the first back EMF, the second back EMF, and the third back EMF in turn at a predetermined interval. For instance, the second input terminal 1112 receives the first back EMF, and receives the second back EMF after the predetermined interval, and so on. What is need to be noticed is, in this embodiment, the first input terminal 1111 and the second input terminal 1112 are respectively the inverting input terminal and the non-inverting input terminal of the analog comparator 111. However, in other embodiments, the first input terminal 1111 and the second input terminal 1112 can be respectively the non-inverting input terminal and the inverting input terminal of the analog comparator 111.

The control chop 11 may further include a first switch K1, a second switch K2, and a third switch K3. One terminal of the first switch K1, one terminal of the second switch K2, and one terminal of the third switch K3 are coupled to the second input terminal 1112 of the analog comparator 111, and another terminal of the first switch K1, another terminal of the second switch K2, and another terminal of the third switch K3 are respectively coupled to corresponding terminals of the motor 12. A control terminal of the first switch K1, a control terminal of the second switch K2, and a control terminal of the third switch K3 are respectively coupled to the control chip 11. The control chip 11 switches on one of the first switch K1, the second switch K2, and the third switch K3 in turn at a predetermined interval, such that the analog comparator 111 receives the corresponding back EMF from the corresponding terminal in turn.

Particularly, the corresponding terminals of the motor 12 may include a terminal 121, a terminal 122, and a terminal 123. Another terminal of the first switch K1 is coupled to the terminal 121, another terminal of the second switch K2 is coupled to the terminal 122, another terminal of the third switch K3 is coupled to the terminal 123. The terminal 121 of the motor 12 outputs the first back EMF, the terminal 122 of the motor 12 outputs the second back EMF, and the terminal 123 of the motor 12 outputs the third back EMF.

In this embodiment, the first switch K1, the second switch K2, and the third switch K3 are arranged outside the control chip 11. In other embodiments, the first switch K1, the second switch K2, and the third switch K3 could be arranged inside the control chip 11.

The control chip 11 may further include at least one storage modules 112. The at least one storage modules 112 is coupled to an output terminal 113 of the analog comparator 111 and configured to store the comparison result corresponding to each comparison performed through the polling method.

In another embodiment, one storage module 112 can be used to store all the comparison results, that is, store the comparison result corresponding to all comparisons performed through the polling method. Wherein, the control chip 11 may include one storage module 112, and the storage module 112 is adopted to store a first comparison result obtained through comparing the first back EMF with the reference voltage, a second comparison result obtained through comparing the second back EMF with the reference voltage, a third comparison result obtained through comparing the third back EMF with the reference voltage.

The control chip 11 may further include a Hall detection module 113. The Hall detection module 113 is coupled to the at least one storage module 112, so as to obtain a comparison result corresponding to each comparison from each of the at least one storage module 112, and to detect whether the at least one EMF has a zero-crossing point according to the one or more comparison results. When a zero-crossing point is detected, the Hall detection module 113 produces an interrupt signal. That is, the Hall detection module 113 is coupled to the storage module 112 and obtains the first comparison result, the second comparison result, and/or the third comparison result. When edge jumps occur to the outputs of the first comparison result, the second comparison result, and/or the third comparison result detected by the Hall detection module 113, the Hall detection module 113 determines that the first back EMF, the second back EMF, and/or the third counter-electromotive have/has a zero-crossing point and produces an interrupt signal. In one embodiment, when a zero-crossing point is detected, an interrupt is triggered and the comparison results stored in the storage module 112 are used to control the motor 12 to operate.

When a zero-crossing point is detected by the Hall detection module 113, the Hall detection module 113 detects a current three phase status and a current operating speed of the motor 12 according to the one or more comparison results, so as to obtain the timing of the next commutation and the time for delaying 30 degrees of the motor 12. That is to say, the Hall detection module 113 detects the current three phase status and the current operating speed of the motor 12 according to the first comparison result, the second comparison result, and/or the third comparison result, so as to obtain the timing of the next commutation and the time for delaying 30 degrees of the motor 12. The Hall detection module 113 could obtain the PWM (Pulse Width Modulation) wave form to be outputted according to the timing of the next commutation and the time for delaying 30 degrees of the motor 12.

The control chip 11 may further include a motor control module 114 coupled to the Hall detection module 113. The motor control module 114 may be used to produce a control signal according to the interrupt signal. The motor control module 114 is coupled to the motor 12 through a driver circuit 13. The driver circuit 13 controls the motor 12 to rotate according to the control signal. In specific, the motor control module 114 could also obtain a PWM wave form from the Hall detection module 113, so as to produce the control signal according to the interrupt signal and the PWM wave form, so as to drive the driver circuit 13 to control the motor 12 to rotate.

In comparison with that in the prior art, the analog comparator 111 of the control chip 11 elaborated in this embodiment is switched to receive one of the first back EMF, the second back EMF, and the third back EMF in turn at a predetermined interval, so as to respectively compare the received back EMF with the reference voltage. The storage module 112 is used to store the comparison result corresponding to each comparison. The Hall detection module 113 detects whether at least one back EMF has a zero-crossing point according to at least one comparison result, if so, produces an interrupt signal. The motor control module 114 produces the control signal according to the interrupt signal, such that the driver circuit 13 could be driven to control the motor 12 to rotate according to the control signal. The analog comparator 111 of this embodiment could be switched to receive one of the first back EMF, the second back EMF, and the third back EMF in turn at a predetermined interval, so as to respectively compare the received back EMF with the reference voltage of the motor 12, in which three comparators are not required to arranged outside, and the hardware cost is therefore saved. In addition, the analog comparator 111 is integrated inside an IC (integrated circuit) chip, and implements the detection of the zero-crossing point of the counter-electromotive through the polling method. When a zero-crossing point is detected, the IC chip could correspondingly produce an interior interrupt. Since the detection is performed by hardware without software, better real-time capability has been achieved.

Figure 2:
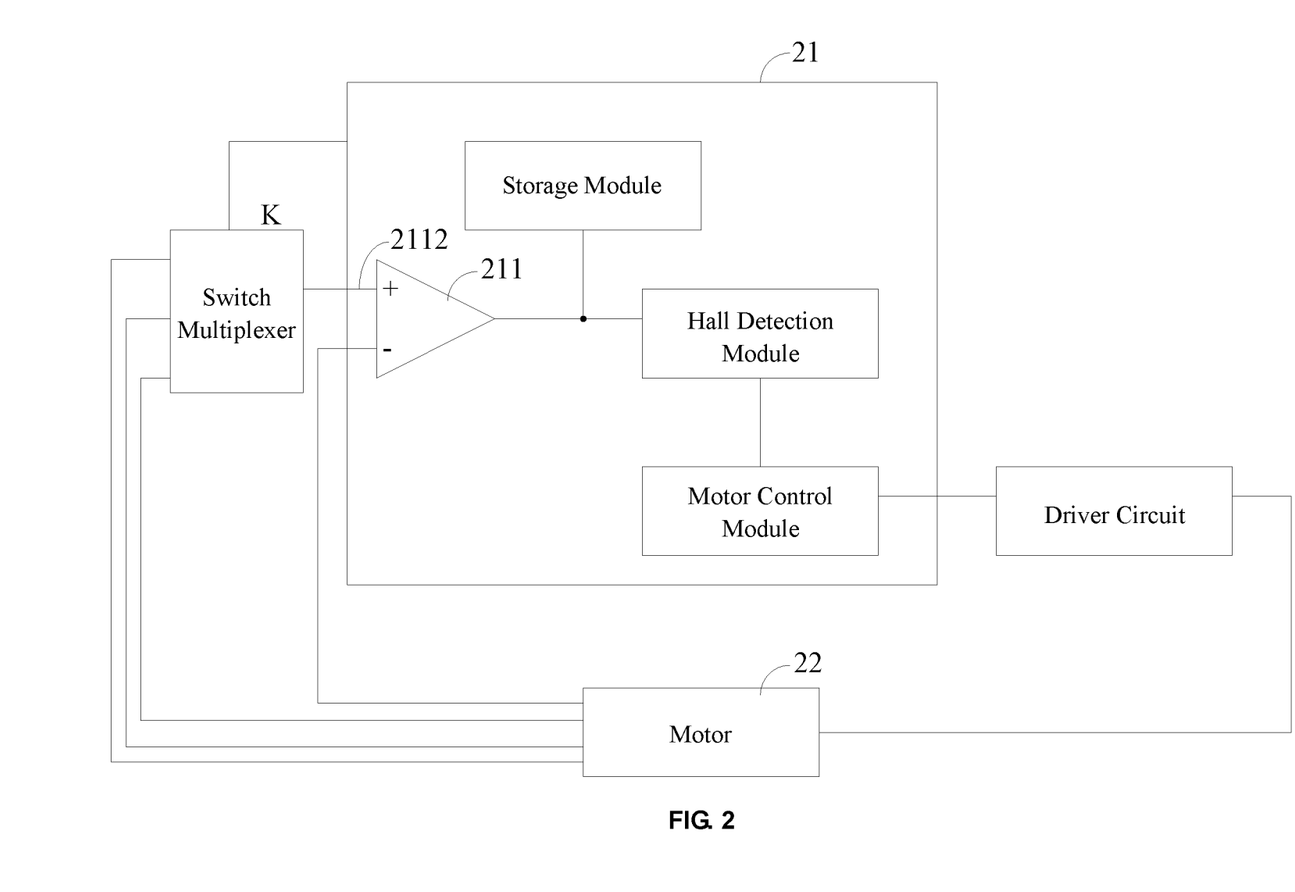
FIG. 2 is a schematic diagram of a control chip for a motor of another embodiment according to the disclosure.

The present disclosure further provides another embodiment of a control chip. Referring to FIG. 2, a schematic diagram of a control chip for a motor of another embodiment according to the disclosure is depicted. Compared with the control chip 11 in the above embodiment, a control chip 21 in this embodiment may include a switch multiplexer K which includes a control terminal, an output terminal, and three input terminals. The control terminal of the switch multiplexer K is coupled to the control chip 21 and is used to receive a predetermined time signal for a polling method. The three input terminals of the switch multiplexer K receives one of the first back EMF, the second back EMF, and the third back EMF of a motor 22 in turn according to the predetermined time signal. The output terminal of the switch multiplexer K outputs an electromotive force corresponding to the received back EMF to a second input terminal 2112 of the analog comparator 211, such that the electromotive force may be compared with the reference voltage.

In comparison with the control chip 11 of the above embodiment, the switch multiplexer K is adopted to substitute the first switch K1, the second switch K2, and the third switch K3, then the cost can be therefore saved.

Figure 3:
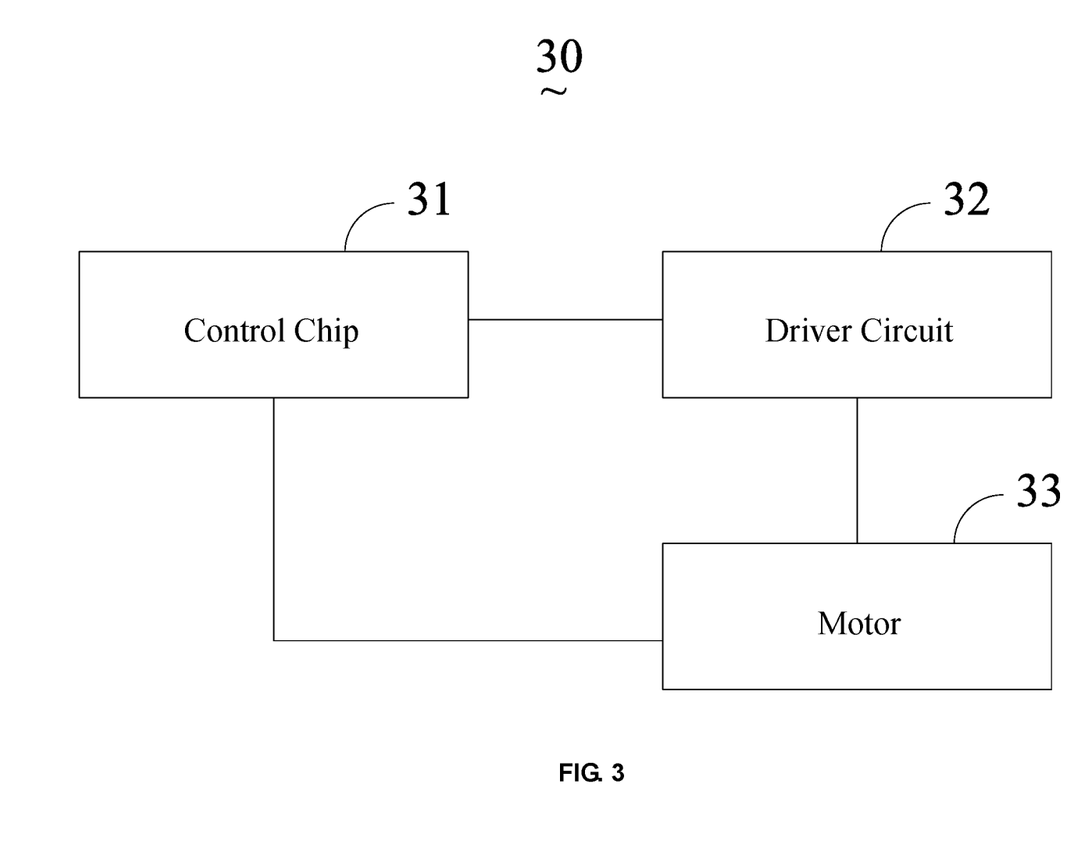
FIG. 3 is a schematic diagram of a control system for a motor of an embodiment according to the disclosure.

The present disclosure further provides an embodiment of a control system for motors. Referring to FIG. 3, a schematic diagram of a control system for a motor of an embodiment according to the disclosure is depicted. The control system 30 may include a control chip 31, a driver circuit 32, and a motor 33. The control chip 31 is coupled to the motor 33 through the driver circuit 32. The driver circuit 32 drives the motor 33 to operate. The control chip 31 is further coupled to the motor 33 and used to receive one of at least one EMF of the motor 33 and a reference voltage. The control chip 31 is the control chip of the above embodiment, which will not be recited herein.

Figure 4:
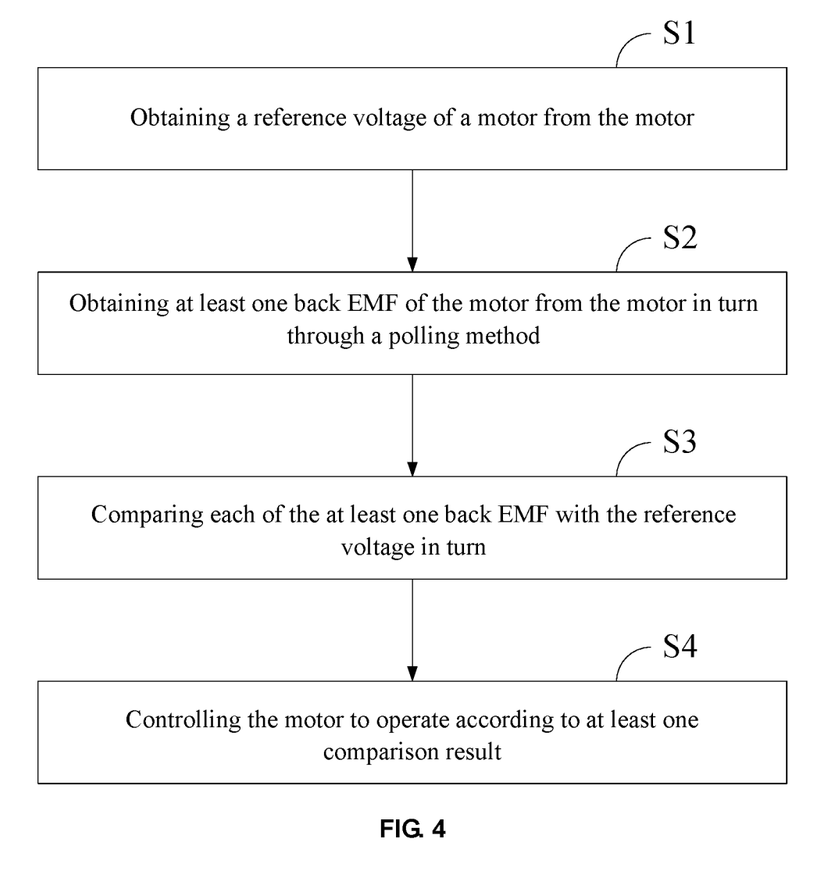
FIG. 4 is a flowchart of a control method for a motor of an embodiment according to the disclosure.

The present disclosure further provides an embodiment of a control method for a motor. The control method of this embodiment is applied to the control chip in the previous embodiments. Referring to FIG. 4, a flowchart of a control method for a motor of an embodiment according to the disclosure is depicted. For purposes of illustration, the method is illustrated as being sequential. However, portions of the method may be performed in other orders or in parallel (e.g., simultaneously). As shown in FIG. 4, the method may comprise the following blocks.

In block S1, the method includes obtaining a reference voltage of a motor from the motor.

In block S2, the method includes obtaining at least one EMF of the motor from the motor in turn through a polling method.

The at least one back EMFs may include a first back EMF, a second back EMF, and a third back EMF. One of the first back EMF, the second back EMF, and the third back EMF are received in turn at a predetermined interval, such that the received back EMF is compared with the reference voltage and then at least one comparison result may be store.

In block S3, the method includes comparing each of the at least one back EMF with the reference voltage in turn.

In block S4, the method includes controlling the motor to operate according to the at least one comparison result.

When the one or more back EMFs are detected to have a zero-crossing point according to the at least one comparison result, an interrupt signal is produced, and then an control signal for controlling the motor to operate is produced according to the interrupt signal.

In addition, when the at least one back EMF is detected to have a zero-crossing point, the three phase status and the operating speed of the motor are detected according to the at least one comparison result, such that the timing of the next commutation and the time for delaying 30 degrees of the motor are obtained to drive the motor to rotate according to the control signal.

In the control method of this embodiment, the at least one EMF of a motor may be obtained in turn through the polling method from the motor, and then may be compared with the reference voltage of the motor 12 in turn. Since there is no necessary to use three comparators, the cost is therefore saved The above description depicts merely some exemplary embodiments of the disclosure, but is meant to limit the scope of the disclosure. Any equivalent structure or flow transformations made to the disclosure, or any direct or indirect applications of the disclosure on other related fields, shall all be covered within the protection of the disclosure.

What is claimed is:

1. A control chip for a motor, wherein the control chip is coupled to the motor and comprises an analog comparator comprising:

a first input terminal and a second input terminal, wherein the first input terminal receives a reference voltage of the motor, the second input terminal receives one of at least one back EMF (Electromotive Force) of the motor in turn, and the analog comparator compares each of the at least one back EMF with the reference voltage in turn through a polling method, so as to produce at least one comparison result and control the motor according to the at least one comparison result;

wherein the control chip further comprises a group of switches, the group of switches is controlled to receive the one of at least one back EMF from the motor in turn every a predetermined interval, such that the second input terminal of the analog comparator receives the one of at least one back EMF in turn every the predetermined interval;

wherein the at least one back EMF comprises a first back EMF, a second back EMF, and a third back EMF, and the analog comparator is switched to receive the first back EMF, the second back EMF and the third back EMF in turn every the predetermined interval, so as to compare the received back EMF with the reference voltage;

wherein the control chip further comprises at least one storage module, the at least one storage module is coupled to an output terminal of the analog comparator and configured to respectively store the comparison result corresponding to each polling method;

wherein the control chip further comprises a Hall detection module coupled to the at least one storage module, the Hall detection module respectively obtains the comparison result corresponding to each polling method from the at least one storage module, detects whether the at least one back EMF has a zero-crossing point according to at least one comparison result, and produces an interrupt signal when the at least one back EMF have the zero-crossing point;

wherein when the at least one back EMF has been detected to have the zero-crossing point, the Hall detection module detects a current three-phase status and an operating speed of the motor according to the at least one comparison result, so as to obtain a timing of a next commutation and a time for delaying 30 degrees of the motor.

2. The control chip of claim 1, wherein the group of switches comprises a first switch, a second switch, and a third switch, one terminal of the first switch, one terminal of the second switch, and one terminal of the third switch are all coupled to the second input terminal of the analog comparator, another terminal of the first switch, another terminal of the second switch and another terminal of the third switch are respectively coupled to a corresponding terminal of the motor, a control terminal of the first switch, a control terminal of the second switch and a control terminal of the third switch are respectively coupled to the control chip, the control chip switches on one of the first switch, the second switch and the third switch in turn every the predetermined interval, such that the analog comparator receives a corresponding back EMF from a corresponding terminal of the motor in turn.

3. The control chip of claim 1, wherein the group of switches comprises a switch multiplexer comprising a control terminal, a output terminal, and three input terminals, the control terminal receives a signal of the predetermined interval for the polling method, the three input terminals receive one of the first back EMF, the second back EMF and the third back EMF in turn every the predetermined interval, the output terminal correspondingly outputs an electromotive force to the second input terminal of the analog comparator such that the electromotive force is compared with the reference voltage in turn.

4. The control chip of claim 1, wherein the control chip further comprises a motor control module coupled to the Hall detection module, the motor control module is configured for producing a control signal according to the interrupt signal, the motor control module is coupled to the motor through a driver circuit, and the driver circuit drives the motor to rotate according to the control signal.

5. A control system for a motor, wherein the control system comprises a control chip, a driver circuit and a motor, the control chip is coupled to the motor through the driver circuit, the driver circuit is configured for driving the motor, and the control chip comprises an analog comparator comprising:
 a first input terminal and a second input terminal, wherein the first input terminal receives a reference voltage of the motor, the second input terminal receives one of at least one back EMF (Electromotive Force) of the motor in turn, and the analog comparator compares each of the at least one back EMF with the reference voltage in turn through a polling method, so as to produce at least one comparison result and control the motor according to the at least one comparison result;
 wherein the control chip further comprises a group of switches, the group of switches is controlled to receive the one of at least one back EMF from the motor in turn every a predetermined interval, such that the second input terminal of the analog comparator receives the one of at least one back EMF in turn every the interval predetermined interval;
 wherein the at least one back EMF comprises a first back EMF, a second back EMF, and a third back EMF, and the analog comparator is switched to receive the first back EMF, the second back EMF and the third back EMF in turn every interval predetermined interval, so as to compare the received back EMF with the reference voltage;
 wherein the group of switches comprises a switch multiplexer comprising a control terminal, a output terminal, and three input terminals, the control terminal receives a signal of the predetermined interval for the polling method, the three input terminals receive one of the first back EMF, the second back EMF and the third back EMF in turn every the predetermined interval, the output terminal correspondingly outputs an electromotive force to the second input terminal of the analog comparator such that the electromotive force is compared with the reference voltage in turn;
 wherein the control chip further comprises at least one storage module, the at least one storage module is coupled to an output terminal of the analog comparator and configured to respectively store the comparison result corresponding to each polling method;
 wherein the control chip further comprises a Hall detection module coupled to the at least one storage module, the Hall detection module respectively obtains the comparison result corresponding to each polling method from the at least one storage module, detects whether the at least one back EMF has a zero-crossing point according to at least one comparison result, and produces an interrupt signal when the at least one back EMF have the zero-crossing point;
 wherein when the at least one back EMF has been detected to have the zero-crossing point, the Hall detection module detects a current three-phase status and an operating speed of the motor according to the at least one comparison result, so as to obtain a timing of a next commutation and a time for delaying 30 degrees of the motor.

6. The control system of claim 5, wherein the group of switches comprises a first switch, a second switch, and a third switch, one terminal of the first switch, one terminal of the second switch, and one terminal of the third switch are all coupled to the second input terminal of the analog comparator, another terminal of the first switch, another terminal of the second switch and another terminal of the third switch are respectively coupled to a corresponding terminal of the motor, a control terminal of the first switch, a control terminal of the second switch and a control terminal of the third switch are respectively coupled to the control chip, the control chip switches on one of the first switch, the second switch and the third switch in turn every the predetermined interval, such that the analog comparator receives a corresponding back EMF from a corresponding terminal of the motor in turn.

7. The control system of claim 5, wherein the control chip further comprises a motor control module coupled to the Hall detection module, the motor control module is configured for producing a control signal according to the interrupt signal, the motor control module is coupled to the motor through a driver circuit, and the driver circuit drives the motor to rotate according to the control signal.

8. A control method for a motor, comprising:
 obtaining a reference voltage of the motor from the motor;
 obtaining at least one back EMF (Electromotive Force) of the motor from the motor in turn through a polling method;
 comparing each of the at least one back EMF with the reference voltage in turn, thereby producing at least one comparison result; and
 controlling the motor to work according to the at least one comparison result;
 wherein the obtaining at least one back EMF (Electromotive Force) of the motor from the motor in turn through a polling method comprises:
 receiving the one of at least one back EMF from the motor in turn every a predetermined interval;
 wherein the at least one back EMFs comprise a first back EMF, a second back EMF and a third back EMF; and the comparing each of the at least one back EMF with the reference voltage in turn comprises:

being switched to receive one of the first back EMF, the second back EMF and the third back EMF in turn every the predetermined interval, thereby comparing with the reference voltage and storing the at least one comparison result;

wherein the controlling the motor according to the at least one comparison result comprises:

producing an interrupt signal when the at least one back EMF are detected to have a zero-crossing point according to the at least one comparison result; and producing a control signal for controlling the motor to work according to the interrupt signal;

wherein the controlling the motor to work comprises:

when the at least one back EMF are detected to have the zero-crossing point, detecting a current three-phase status and a current operating speed of the motor according to the at least one comparison result, thereby obtaining the timing of the next commutation and the time for delaying 30 degrees of the motor, and driving the motor to rotate according to the control signal.

\* \* \* \* \*